United States Patent
MacNeil et al.

(10) Patent No.: US 10,348,652 B2
(45) Date of Patent: Jul. 9, 2019

(54) SYSTEMS AND METHODS FOR PROPAGATING METADATA OF IN-FLIGHT PACKETS WITHIN KERNEL SPACE

(71) Applicant: Juniper Networks, Inc., Sunnyvale, CA (US)

(72) Inventors: Erin C. MacNeil, Carp (CA); Sreekanth Rupavatharam, Campbell, CA (US); Hariprasad Shanmugam, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 47 days.

(21) Appl. No.: 15/418,717

(22) Filed: Jan. 28, 2017

(65) Prior Publication Data

US 2018/0219805 A1 Aug. 2, 2018

(51) Int. Cl.
| | | |
|---|---|---|
| G06F 3/06 | (2006.01) | |
| G06F 9/54 | (2006.01) | |
| H04L 12/879 | (2013.01) | |
| H04L 12/46 | (2006.01) | |
| H04L 29/06 | (2006.01) | |
| H04L 12/935 | (2013.01) | |

(52) U.S. Cl.
CPC .......... *H04L 49/9026* (2013.01); *G06F 3/065* (2013.01); *G06F 3/067* (2013.01); *G06F 3/0619* (2013.01); *G06F 3/0656* (2013.01); *G06F 9/545* (2013.01); *H04L 12/4633* (2013.01); *H04L 69/161* (2013.01); *H04L 49/3009* (2013.01)

(58) Field of Classification Search
CPC ... H04L 12/4633; G06F 3/065; G06F 3/0656; G06F 3/067; G06F 3/0619
See application file for complete search history.

(56) References Cited

U.S. PATENT DOCUMENTS

| | | | | |
|---|---|---|---|---|
| 2002/0141418 | A1* | 10/2002 | Ben-Dor | H04L 12/40123 370/398 |
| 2003/0069938 | A1 | 4/2003 | Russell | |
| 2006/0085557 | A1* | 4/2006 | Ishijima | H04L 45/00 709/238 |
| 2009/0198826 | A1* | 8/2009 | Ishijima | G06F 9/545 709/231 |
| 2011/0122884 | A1* | 5/2011 | Tsirkin | G06F 9/00 370/412 |
| 2017/0180273 | A1* | 6/2017 | Daly | H04L 69/22 |
| 2017/0237640 | A1* | 8/2017 | Stocker | H04L 43/0876 709/224 |

* cited by examiner

*Primary Examiner* — Charles C Jiang
*Assistant Examiner* — Ryan C Kavleski
(74) *Attorney, Agent, or Firm* — FisherBroyles, LLP

(57) ABSTRACT

The disclosed computer-implemented method may include (1) identifying, in kernel space on a network device, a packet that is destined for a remote device, (2) passing, along with the packet, metadata for the packet to a packet buffer in kernel space on the network device, (3) framing, by the kernel module in kernel space, the packet such that the packet egresses via a tunnel interface driver on the network device, (4) encapsulating, by the tunnel interface driver, the packet with the metadata, and then (5) forwarding, by the tunnel interface driver, the packet to the remote device based at least in part on the metadata with which the packet was encapsulated. Various other methods, systems, and computer-readable media are also disclosed.

14 Claims, 5 Drawing Sheets

SYSTEMS AND METHODS FOR PROPAGATING METADATA OF IN-FLIGHT PACKETS WITHIN KERNEL SPACE

BACKGROUND

In traditional configurations, computing systems often partition memory resources between user space and kernel space. In some examples, kernel space may include and/or represent memory that has been allocated to an operating system kernel that manages computer hardware and/or mediates access to computing and/or networking resources. In contrast, user space may include and/or represent memory that has been allocated to general application software and/or components.

Unfortunately, applications running in user space have traditionally been unable to propagate metadata for their packets across network protocol layers in kernel space. As a result, these applications may have traditionally been unable to control and/or influence routing decisions in connection with their packets. The instant disclosure, therefore, identifies and addresses a need for systems and methods for propagating metadata of in-flight packets between user space and kernel space.

SUMMARY

As will be described in greater detail below, the instant disclosure generally relates to systems and methods for propagating metadata of in-flight packets within kernel space. In one example, a computer-implemented method for propagating metadata of in-flight packets within kernel space may include (1) identifying, in kernel on a network device, a packet that is destined for a remote device, (2) passing, along with the packet, metadata for the packet to a packet buffer in kernel space on the network device, (3) framing, by the kernel module in kernel space, the packet such that the packet egresses via a tunnel interface driver on the network device, (4) encapsulating, by the tunnel interface driver, the packet with the metadata, and then (5) forwarding, by the tunnel interface driver, the packet to the remote device based at least in part on the metadata with which the packet was encapsulated.

As another example, a system for implementing the above-described method may include various modules stored in memory. The system may also include at least one physical processor that executes these modules. For example, the system may include (1) a kernel module that (A) identifies, in kernel space on a network device, a packet that is destined for a remote device, (B) passes, along with the packet, metadata for the packet to a packet buffer in kernel space on the network device, (C) frames the packet such that the packet egresses via a tunnel interface driver on the network device, and wherein (2) the tunnel interface driver (A) encapsulates the packet with the metadata and (B) forwards the packet to the remote device based at least in part on the metadata with which the packet was encapsulated.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) identify, in kernel space on a network device, a packet that is destined for a remote device, (2) pass, along with the packet, metadata for the packet to a packet buffer in kernel space on the network device, (3) frame, by the kernel module in kernel space, the packet such that the packet egresses via a tunnel interface driver on the network device, (4) encapsulate, by the tunnel interface driver, the packet with the metadata, and then (5) forward, by the tunnel interface driver, the packet to the remote device based at least in part on the metadata with which the packet was encapsulated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
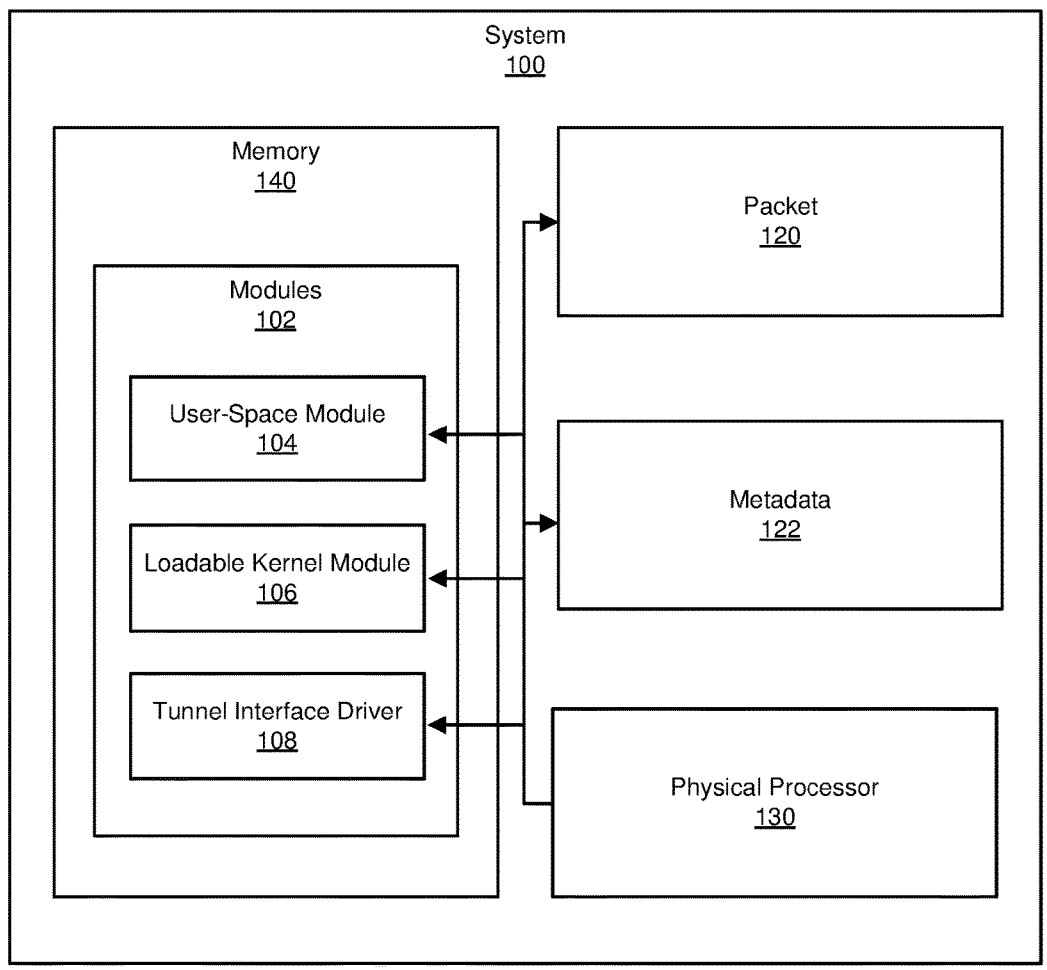
FIG. 1 is a block diagram of an exemplary system for propagating metadata of in-flight packets within kernel space.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for propagating metadata of in-flight packets within kernel space. As will be explained in greater detail below, the systems and methods described herein may enable user-space applications on a network device to pass metadata for packets across network layers of the protocol stack in kernel space. In other words, these systems and methods may ensure that metadata for such packets is not lost as the packets traverse from one layer to another within the protocol stack. By doing so, these systems and methods may enable user-space applications to make routing decisions, which were traditionally made exclusively in kernel space, via the metadata.

Additionally or alternatively, the systems and methods described herein may extend a packet buffer such that any network layer within the protocol stack is able to access, attach, modify, and/or remove metadata in connection with the packet. Moreover, this extension of the packet buffer may enable the packet to traverse the various network layers within the protocol stack without losing any of the corresponding metadata. Accordingly, these systems and methods may ensure that the packet's metadata is not lost as the packet traverses the network layers within the protocol stack.

Figure 2:
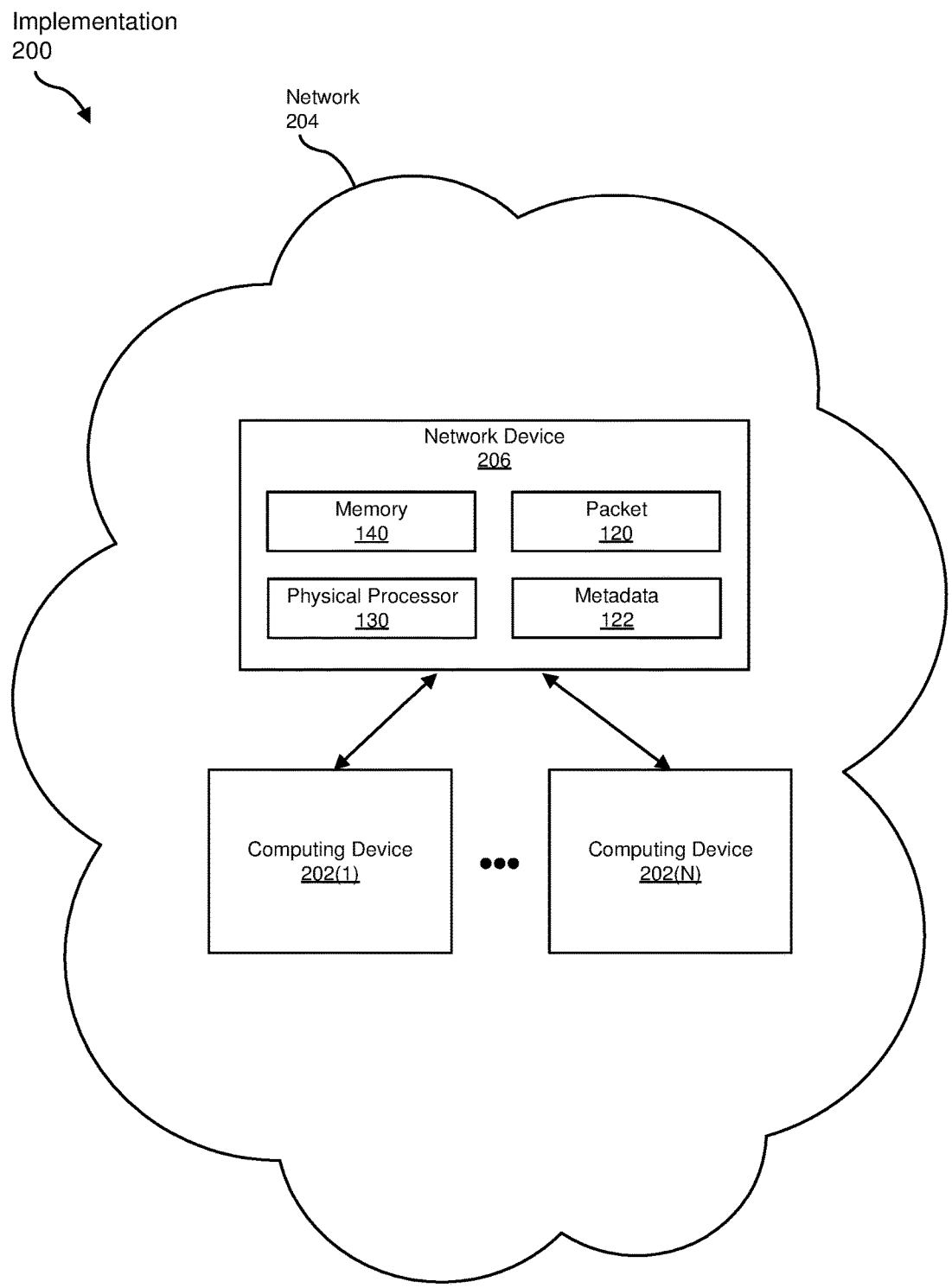
FIG. 2 is a block diagram of an exemplary implementation for propagating metadata of in-flight packets within kernel space.
Figure 3:
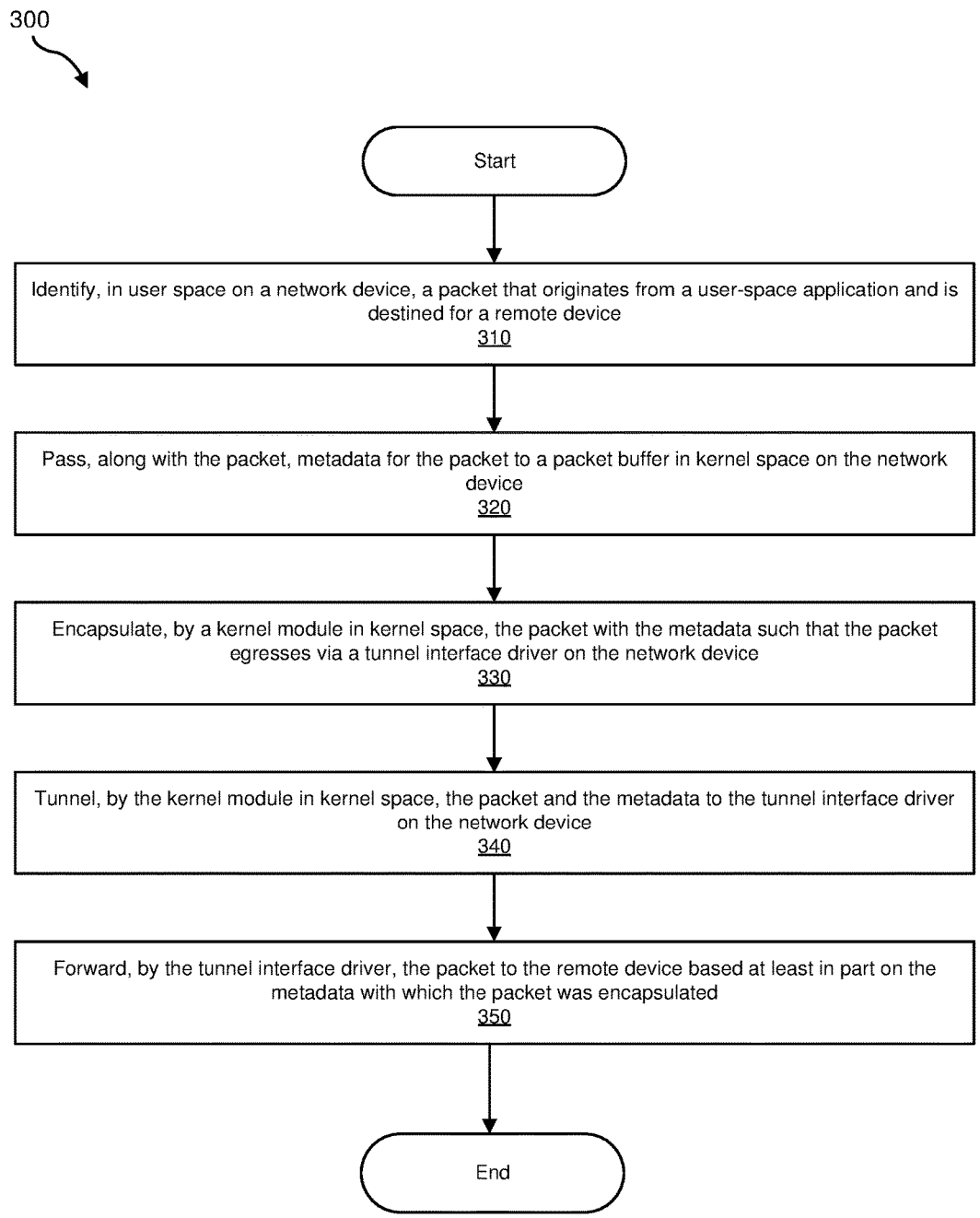
FIG. 3 is a flow diagram of an exemplary method for propagating metadata of in-flight packets within kernel space.
Figure 4:
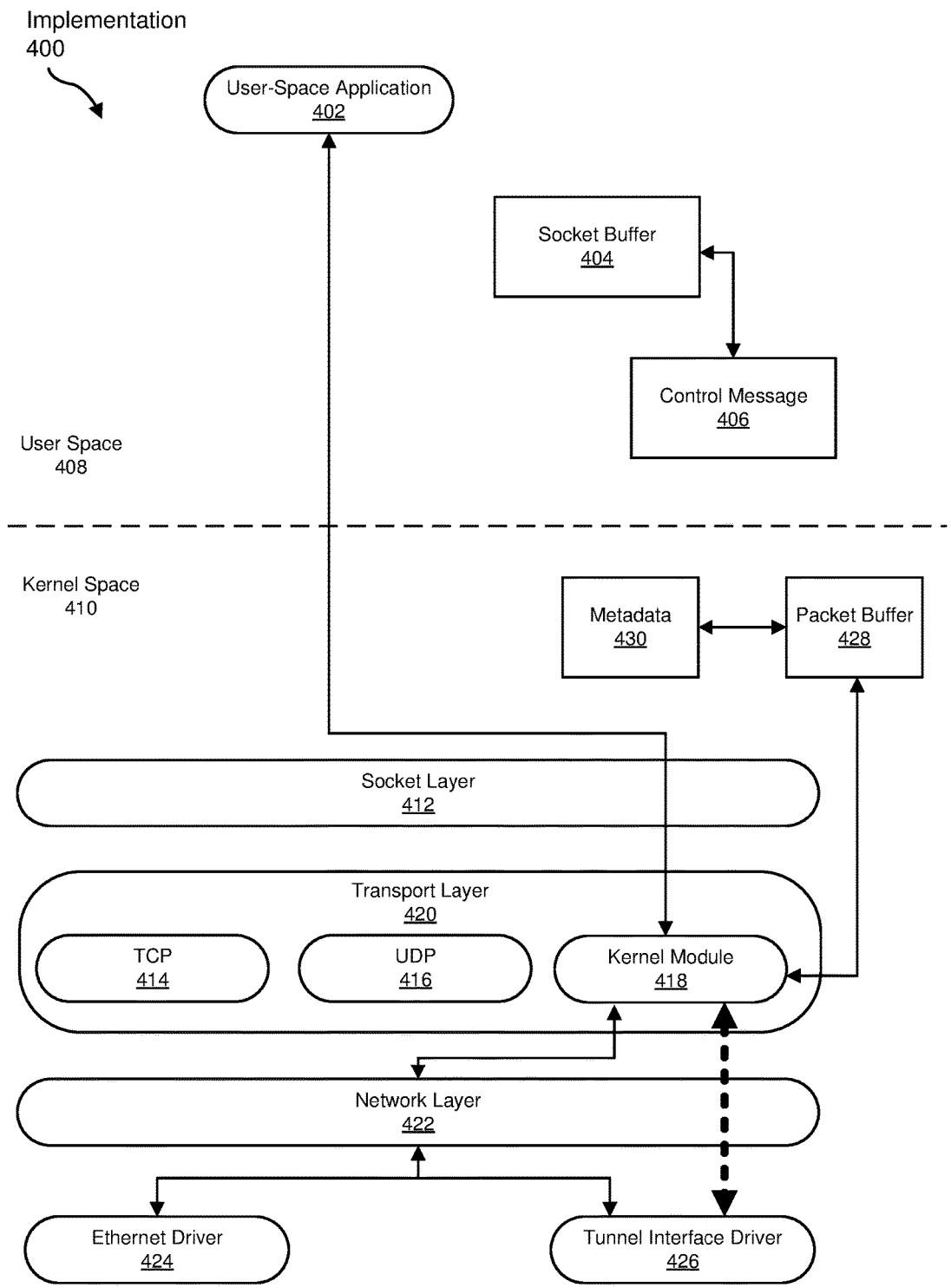
FIG. 4 is a block diagram of an exemplary implementation for propagating metadata of in-flight packets within kernel space.

The following will provide, with reference to FIGS. 1, 2, and 4, detailed descriptions of exemplary systems for propagating metadata of in-flight packets within kernel space. Detailed descriptions of corresponding computer-implemented methods will be provided in connection with FIG. 3. In addition, detailed descriptions of an exemplary computing system capable of implementing the embodiments described herein will be provided in connection with FIG. 5.

FIG. 1 is a block diagram of an exemplary system 100 for propagating metadata of in-flight packets within kernel space. As illustrated in this figure, exemplary system 100 may include one or more modules 102 for performing one or more tasks. As will be explained in greater detail below, modules 102 may include a user-space module 104, a kernel module 106, and a tunnel interface driver 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., network device 206 and/or computing devices 202(1)-(N)). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate propagating metadata of in-flight packets within kernel space. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more packets, such as packet 120. Packet 120 generally represents any type or form of communication and/or message sent from one computing device to another. Exemplary system 100 may further include metadata for packets, such as metadata 122. Metadata 122 generally represents any type or form of data and/or information that describes and/or provides details about a packet. Examples of metadata 122 include, without limitation, Type Length Value (TLV) metadata, information that identifies a packet's destination, a route that leads to a packet's destination, combinations or variations of one or more of the same, and/or any other suitable metadata.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 206 in communication with computing devices 202(1)-(N) via a network 204. In one example, all or a portion of the functionality of modules 102 may be performed by network device 206, computing devices 202(1)-(N), and/or any other suitable computing system. As will be described in greater detail below, one or more of modules 102 from FIG. 1 may, when executed by at least one processor of network device 206, enable network device 206 to propagate metadata of in-flight packets between user space and kernel space.

Network device 206 generally represents any type or form of computing device capable of reading computer-executable instructions. In one example, network device 206 may include and/or represent a router (such as a provider edge router, a hub router, a spoke router, an autonomous system boundary router, and/or an area border router). Additional examples of network device 206 include, without limitation, switches, hubs, modems, bridges, repeaters, gateways, multiplexers, network adapters, network interfaces, network racks, chasses, servers, client devices, portions of one or more of the same, combinations or variations of one or more of the same, and/or any other suitable network device.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 500 in FIG. 5, or any other suitable computing devices.

Network 204 generally represents any medium or architecture capable of facilitating communication or data transfer. In one example, network 204 may facilitate communication between network device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for propagating metadata of in-flight packets within kernel space. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify, in kernel space on a network device, a packet that is destined for a remote device. For example, kernel space module 106 may, as part of network device 206 in FIG. 2, identify packet 120. In one example, packet 120 may have originated from a user-space application running in user space on network device 206. In this example, packet 120 may be destined for computing device 202(1).

In another example, packet 120 may have originated from a remote device (such as computing device 202(1) or 202(N)) within network 204. In this example, packet 120 may be destined for a user-space application running in user space on network device 206. Alternatively, packet 120 may be destined for another remote device.

The systems described herein may perform step 310 in a variety of different ways and/or contexts. In some examples, kernel module 106 may monitor network device 206 for traffic originating from user-space applications on network device 206 and/or other remote devices. For example, a user-space application may generate and/or issue packet 120 and then pass packet 120 to kernel space on network device 206. While monitoring network device 206, kernel module 106 may detect packet 120 after having been passed from user space via a socket buffer. In one example, kernel module 106 may identify packet 120 as having originated from that particular user-space application and/or being destined for computing device 202(1).

Similarly, tunnel interface driver 108 may monitor network device 206 for traffic originating from remote devices and/or arriving at network device 206. In one example, tunnel interface driver 108 may identify a packet that has arrived at network device 206 from computing device 202(N). For example, a packet may arrive at network device 206 and be handled by tunnel interface driver 108. In this example, tunnel interface driver 108 may detect and/or identify this packet upon arriving at network device 206.

In some examples, kernel module 106 may reside in kernel space and monitor outgoing traffic heading for remote devices. Additionally or alternatively, tunnel interface driver 108 may reside in kernel space and monitor incoming traffic heading for user space to be consumed by user-space applications.

Returning to FIG. 3, at step 320 one or more of the systems described herein may pass, along with the packet, metadata for the packet to a packet buffer in kernel space on the network device. For example, kernel module 106 may, as part of network device 206 in FIG. 2, pass metadata 122 for packet 120 to a packet buffer in kernel space on network device 206. In this example, kernel module 106 may pass metadata 122 to the packet buffer along with and/or in conjunction with packet 120 itself.

The systems described herein may perform step 320 in a variety of different ways and/or contexts. In some examples, kernel module 106 may load packet 120 into the packet buffer in kernel space. Additionally or alternatively, kernel module 106 may load metadata 122 into the packet buffer in kernel space. Accordingly, packet 120 and metadata 122 may reside temporarily in the packet buffer in connection with one another. The packet buffer may carry packet 120 and metadata 122 across certain layers of the protocol stack and/or to tunnel interface driver 108 or user space.

In some examples, user-space module 104 may, as part of network device 206 in FIG. 2, load packet 120 and metadata 122 into a socket buffer in user space on network device 206. In such examples, user-space module 104 may provide and/or pass the socket buffer to kernel module 106 or the packet buffer in kernel space on network device 206. Accordingly, kernel module 106 may obtain and/or receive both packet 120 and metadata 122 by way of the socket buffer provided and/or passed from user space.

Returning to FIG. 3, at step 330 one or more of the systems described herein may frame the packet such that the packet egresses via a tunnel interface driver. For example, kernel module 106 may, as part of network device 206 in FIG. 2, frame packet 120 such that packet 120 egresses via tunnel interface driver 108 on network device 206. In other words, kernel module 106 may frame packet 120 in a way that forces packet 120 to egress via tunnel interface driver 108.

The systems described herein may perform step 330 in a variety of different ways and/or contexts. In some examples, kernel module 106 may associate metadata 122 with packet 120 such that metadata 122 is accessible with packet 120 throughout the protocol stack (e.g., the Open Systems Interconnection (OSI) model). For example, by associating metadata 122 with packet 120 in this way, kernel module 106 may enable various entry points in the protocol stack to access metadata 122 in connection with packet 120 as packet 120 traverses across multiple network layers within the protocol stack.

Examples of such network layers include, without limitation, the link layer, the network layer, the protocol, layer, the application layer, the physical layer, the transport layer, the session layer, the presentation layer, combinations or variations of one or more of the same, and/or any other suitable network layers. The various entry points in the protocol stack may be able to access and/or facilitate access to metadata 122 in connection with packet 120 by adding information to metadata 122, removing information from metadata 122, modifying information in metadata 122, and/or fetching metadata 122.

Various entry points in the protocol stack may access, remove, modify, and/or fetch metadata 122 as the packet traverses the protocol stack. For example, one entry point in the link layer may add certain information to metadata 122 as packet 120 passes through the link layer. In this example, another entry point in the application layer may add other information to metadata 122 as packet 120 passes through the application layer.

In some examples, kernel module 106 may extend the packet buffer in kernel space on network device 206 to facilitate attaching metadata 122 to packet 120. In one example, kernel module 106 may load packet 120 into the packet buffer and then attach metadata 122 to the packet buffer. In this example, kernel module 106 may add one or more additional data fields to the packet buffer. By doing so, kernel module 106 may enable any network layer within the protocol stack to attach, remove, modify, and/or fetch any metadata by way of the additional data fields. Accordingly, kernel module 106 may ensure that metadata added at one network layer is accessible and/or available for use at another network layer.

In some examples, kernel module 106 may enable a user-space application to select the remote device (such as computing device 202(1) or 202(N)) as the destination of the packet. In such examples, kernel module 106 may enable the user-space application to generate metadata that identifies that remote device as the destination for the packet. In other words, since kernel module 106 enables any network layer within the protocol stack to attach, remove, modify, and/or fetch metadata so that such metadata is preserved throughout the protocol stack, the user-space application may now be able to make and/or pass routing decisions for its packets by specifying and/or identifying those routing decisions in the packets' metadata. In contrast, traditional configurations may have been unable to ensure that metadata for packets originating from the user-space application would not be lost as the packets traverse the protocol stack. As a result, the user-space application would not have been able to make routing decisions for its packets.

In some examples, kernel module 106 may attach metadata 122 to packet 120 as a header. For example, kernel module 106 may insert metadata 122 into the header of packet 120. As a result, packet 120 may carry metadata 122 to tunnel interface driver 108.

In some examples, kernel module 106 may forward and/or pass packet 120 and/or metadata 122 to tunnel interface driver 108. For example, kernel module 106 may propagate metadata 122 with packet 120 across multiple network layers to tunnel interface driver 108. In this example, tunnel interface driver 108 may receive metadata 122 and packet 120 in connection with one another from kernel module 106.

Returning to FIG. 3, at step 340 one or more of the systems described herein may encapsulate the packet with the metadata. For example, tunnel interface driver 108 may, as part of network device 206 in FIG. 2, encapsulate packet 120 with metadata 122. The term "encapsulation" and the phrase "to encapsulate," as used herein, generally refer to the process of organizing and/or formatting a packet and/or metadata to correspond to and/or function in connection with one or more networking protocols.

The systems described herein may perform step 340 in a variety of different ways and/or contexts. In some examples, tunnel interface driver 108 may format packet 120 and/or metadata 122 in accordance with one or more networking protocols from the OSI model. For example, tunnel interface driver 108 may format packet 120 and/or metadata 122 to correspond to and/or function in connection with a physical layer protocol, a link layer protocol, a network layer protocol, a transport layer protocol, a session layer protocol, a presentation layer protocol, and/or an application layer protocol.

Additionally or alternatively, tunnel interface driver 108 may incorporate metadata 122 into packet 120 as a header. In one example, tunnel interface driver 108 may format the header such that the header indicates the destination of packet 120. As a result, tunnel interface driver 108 may be able to forward packet 120 and metadata 122 to the next hop on the way to the destination, and the next hop may use metadata 122 in the header to ensure that packet 120 continues along the correct path.

Returning to FIG. 3, at step 350 one or more of the systems described herein may forward the packet to the remote device based at least in part on the metadata with which the packet was encapsulated. For example, tunnel interface driver 108 may, as part of network device 206 in FIG. 6, forward packet 120 to computing device 202(1) within network 204 based at least in part on metadata 122 with which packet 120 was encapsulated. In one example, tunnel interface driver 108 may use metadata 122 generated by the user-space application to make the forwarding decision for packet 120. Or perhaps more accurately stated, the user-space application may be able to make the forwarding decision for packet 120, and tunnel interface driver 108 may enforce and/or execute that forwarding decision for packet 120 based at least in part on metadata 122.

The systems described herein may perform step 350 in a variety of different ways and/or contexts. In some examples, tunnel interface driver 108 may send packet 120 to the next hop on the way to computing device 202(1) as instructed by metadata 122. In other examples, tunnel interface driver 108 may send packet 120 directly to computing device 202(1) as instructed by metadata 122.

In addition to propagating metadata of in-flight packets from user space to kernel space, the various systems and methods described herein may also propagate metadata of in-flight packets from kernel space to user space. These systems and methods may apply, implement, and/or use any of the mechanisms, devices, and/or means described above to perform this propagation from kernel space to user space. For example, a packet may arrive at network device 206 from computing device 202(1) or 202(N). As the packet arrives, tunnel interface driver 108 may detect and/or identify the packet. In this example, tunnel interface driver 108 may forward the packet along with its corresponding metadata to kernel module 106. In turn, kernel module 106 may pass the packet and its corresponding metadata to the appropriate user-space application to enable the user-space application to consume the packet's metadata in connection with the packet itself.

In addition to propagating metadata of in-flight packets from user space to kernel space and kernel space to user space, the various systems and methods described herein may also propagate metadata of in-flight packets within kernel space. These systems and methods may apply, implement, and/or use any of the mechanisms, devices, and/or means described above to perform this propagation within kernel space. For example, a packet may arrive at network device 206 from computing device 202(1) or 202(N). As the packet arrives, tunnel interface driver 108 may detect and/or identify the packet. In this example, tunnel interface driver 108 may load the packet along with any corresponding metadata into the packet buffer. In turn, kernel module 106 and/or another module in kernel space may access, remove, modify, and/or fetch that packet's metadata from the packet buffer at any of the various entry points in the protocol stack as the packet traverses the protocol stack. This packet may then egress back out tunnel interface driver 108 with the corresponding metadata (including any changes made while traversing the protocol stack) without ever passing through user space on network device 206. In other words, tunnel interface driver 108 may forward the packet along with the corresponding metadata to another remote device without ever passing the packet to user space on network device 206.

FIG. 4 shows a specific implementation 400 for propagating metadata of in-flight packets within kernel space. As illustrated in FIG. 4, implementation 400 may involve user space 408 and kernel space 410 of a network device. In this example, user space 408 may include a user-space application 402 and a socket buffer 404. Kernel space 410 may include a socket layer 412, a transport layer 420, a network layer 422, an Ethernet driver 424, a tunnel interface driver 426, and a packet buffer 428. In addition, transport layer 420 may include and/or represent a Transmission Control Protocol (TCP) 414, a User Datagram Protocol (UDP) 416, and a kernel module 418.

In this example, user-space application 402 may generate a packet and select a destination for that packet. User-space application 402 may generate a control message 406 that identifies that destination for the packet. User-space application 402 may load the packet and control message 406 into socket buffer 404 and pass socket buffer 404 to kernel module 418 through socket layer 412. Upon receiving socket buffer 404, user-space application 402 may extract the identity of the packet's destination from control message 406. This identity may constitute and/or represent at least a portion of metadata 430. Kernel module 418 may load the packet into packet buffer 428 and attach metadata 430 directly to packet buffer 428 as well. Kernel module 418 may then pass packet buffer 428 to tunnel interface driver 426 through network layer 422.

Upon receiving packet buffer 428, kernel module 418 may examine and/or consult metadata 430 attached to packet buffer 428 to determine the destination for the packet. Kernel module 418 may then encapsulate and/or frame the egress packet for transmission to that destination. In one example, as part of that encapsulation and/or framing, kernel module 418 may identify and/or specify the destination and/or next hop in the header of the packet.

Figure 5:
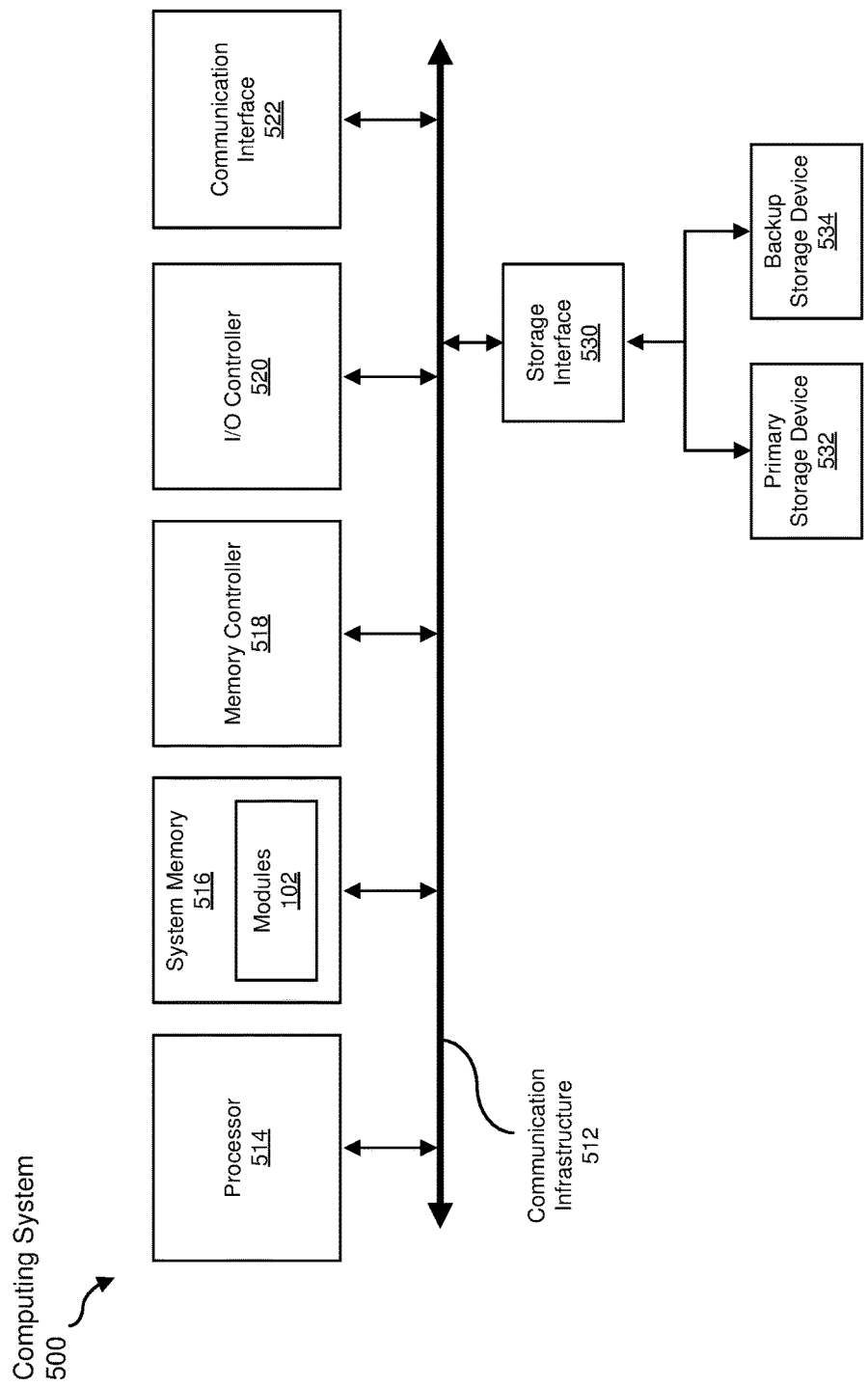
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or store all or a portion of modules 102 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the OSI reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    identifying, in kernel space on a network device, a packet that is destined for a remote device external to the network device;
    obtaining Type Length Value (TLV) metadata for the packet from a user-space application in user space on the network device, wherein the TLV metadata:
        was generated by the user-space application in user space on the network device; and
        includes information that identifies the remote device as the destination of the packet;
    passing, along with the packet, the TLV metadata for the packet to a packet buffer in kernel space on the network device;
    framing, by a kernel module in kernel space, the packet such that the packet egresses via a tunnel interface driver on the network device;
    encapsulating, by the kernel module in kernel space, the packet with the TLV metadata;
    associating the TLV metadata with the packet such that the TLV metadata is accessible in connection with the packet throughout a protocol stack that comprises a plurality of network layers;
    propagating the TLV metadata with the packet across the plurality of network layers included in the protocol stack to the tunnel interface driver to enable the tunnel interface driver to access the TLV metadata in connection with the packet as the packet arrives at the tunnel interface driver;
    making a routing decision to forward the packet to the remote device due at least in part to the remote device being identified as the destination of the packet by information included in the TLV metadata; and
    forwarding, by the tunnel interface driver, the packet to the remote device based at least in part on the routing decision.

2. The method of claim 1, wherein the TLV metadata comprises a route that leads to the remote device.

3. The method of claim 1, further comprising extending the packet buffer in kernel space on the network device to facilitate attaching the TLV metadata to the packet by way of the kernel module; and
    wherein:
        the packet buffer includes the packet;
        encapsulating the packet with the TLV metadata comprises attaching the TLV metadata to the packet buffer; and
        tunneling the packet and the TLV metadata to the tunnel interface driver comprises
    passing the packet buffer to the tunnel interface driver.

4. The method of claim 3, wherein extending the packet buffer comprises adding at least one additional data field to the packet buffer such that any network layer within the protocol stack on the network device is able to attach the TLV metadata to the packet buffer via the additional data field.

5. The method of claim 1, wherein the packet that is destined for the remote device originated from the user-space application in user space on the network device; and
    further comprising enabling the user-space application to select the remote device as the destination of the packet.

6. The method of claim 1, wherein passing the TLV metadata along with the packet to the kernel module comprises:
    loading the packet and the TLV metadata into a socket buffer in user space on the network device; and
    providing the socket buffer to the kernel module.

7. The method of claim 1, further comprising:
    identifying, at the tunnel interface driver, another packet received from the remote device;
    forwarding, by the tunnel interface driver, the other packet along with other metadata for the other packet to the kernel module in kernel space; and
    passing, by the kernel module, the other packet and the other metadata to a user-space application in user space on the network device to enable the user-space application to consume the TLV metadata in connection with the packet.

8. The method of claim 1, wherein:
    the packet that is destined for the remote device originated from another remote device; and
    further comprising:
        enabling any network layer within the protocol stack on the network device to attach the TLV metadata to the packet; and
        forwarding, by the tunnel interface driver, the packet along with the TLV metadata to the other remote device without ever passing the packet to user space on the network device.

9. A system comprising:
    a kernel module, stored in memory, that:
        identifies, in kernel space on a network device, a packet that is destined for a remote device external to the network device;
        obtains Type Length Value (TLV) metadata for the packet from a user-space application in user space on the network device, wherein the TLV metadata:
            was generated by the user-space application in user space on the network device; and
            includes information that identifies the remote device as the destination of the packet;
        passes, along with the packet, the TLV metadata for the packet to a packet buffer in kernel space on the network device;

frames the packet such that the packet egresses via a tunnel interface driver on the network device;

encapsulates the packet with the TLV metadata;

associates the TLV metadata with the packet such that the TLV metadata is accessible in connection with the packet throughout a protocol stack that comprises a plurality of network layers; and propagates the TLV metadata with the packet across the plurality of network layers included in the protocol stack to the tunnel interface driver to enable the tunnel interface driver to access the TLV metadata in connection with the packet as the packet arrives at the tunnel interface driver;

wherein the tunnel interface driver:

makes a routing decision to forward the packet to the remote device due at least in part to the remote device being identified as the destination of the packet by information included in the TLV metadata; and forwards the packet to the remote device based at least in part on the routing decision; and at least one physical processor that executes the kernel module and the tunnel interface driver.

10. The system of claim 9, wherein the TLV metadata comprises a route that leads to the remote device.

11. The system of claim 9, wherein:

the kernel module extends the packet buffer in kernel space on the network device to facilitate attaching the TLV metadata to the packet by way of the kernel module;

the packet buffer includes the packet; and the kernel module:

attaches the TLV metadata to the packet buffer; and passes the packet buffer to the tunnel interface driver.

12. The system of claim 11, wherein the kernel module adds at least one additional data field to the packet buffer such that any network layer within the protocol stack on the network device is able to attach the TLV metadata to the packet buffer via the additional data field.

13. The system of claim 9, wherein:

the packet that is destined for the remote device originated from the user-space application in user space on the network device; and the kernel module enables the user-space application to select the remote device as the destination of the packet.

14. A non-transitory computer-readable medium comprising one or more computer-executable instructions that, when executed by at least one processor of a computing device, cause the computing device to:

identify, in user space on a network device, a packet that originates from a user-space application and is destined for a remote device external to the network device;

obtain Type Length Value (TLV) metadata for the packet from a user-space application in user space on the network device, wherein the TLV metadata:

was generated by the user-space application in user space on the network device; and includes information that identifies the remote device as the destination of the packet;

pass, along with the packet, the TLV metadata for the packet to a packet buffer in kernel space on the network device;

frame, by a kernel module in kernel space, the packet such that the packet egresses via a tunnel interface driver on the network device;

encapsulate, by the kernel module in kernel space, the packet with the TLV metadata;

associate the TLV metadata with the packet such that the TLV metadata is accessible in connection with the packet throughout a protocol stack that comprises a plurality of network layers;

propagate the TLV metadata with the packet across the plurality of network layers included in the protocol stack to the tunnel interface driver to enable the tunnel interface driver to access the TLV metadata in connection with the packet as the packet arrives at the tunnel interface driver;

make a routing decision to forward the packet to the remote device due at least in part to the remote device being identified as the destination of the packet by information included in the TLV metadata; and forward, by the tunnel interface driver, the packet to the remote device based at least in part on the routing decision.

* * * * *